United States Patent [19]

Werner et al.

[11] Patent Number: 5,252,617
[45] Date of Patent: Oct. 12, 1993

[54] EXPANDABLE POLYURETHANE POWDER PREPARATIONS CONTAINING BLOWING AGENTS AND THEIR USE FOR THE PRODUCTION OF FOAMED POLYURETHANE MOLDINGS

[75] Inventors: Joachim Werner, Dormagen; Walter Meckel, Neuss; Dirk Wegener, Monheim, all of Fed. Rep. of Germany

[73] Assignee: Bayer Aktiengesellschaft, Leverkusen, Fed. Rep. of Germany

[21] Appl. No.: 33,527

[22] Filed: Mar. 19, 1993

[30] Foreign Application Priority Data

Mar. 25, 1992 [DE] Fed. Rep. of Germany ....... 4209711

[51] Int. Cl.$^5$ .............................. C08J 9/16; C08J 9/20
[52] U.S. Cl. ........................................ 521/56; 521/60; 521/72
[58] Field of Search .................. 521/56, 60, 72

[56] References Cited

U.S. PATENT DOCUMENTS 4,940,750 7/1990 Roshauser et al. ................. 524/871
4,985,490 1/1991 Rosthauser et al. ................ 524/871

FOREIGN PATENT DOCUMENTS 2017354 11/1990 Canada .
2036125 9/1991 Canada .

*Primary Examiner*—Morton Foelak
*Attorney, Agent, or Firm*—Joseph C. Gil; N. Denise Brown

[57] ABSTRACT

The invention relates to expandable polyurethane powder preparations containing blowing agents and to their use for the production of foamed polyurethane moldings.

10 Claims, No Drawings

EXPANDABLE POLYURETHANE POWDER PREPARATIONS CONTAINING BLOWING AGENTS AND THEIR USE FOR THE PRODUCTION OF FOAMED POLYURETHANE MOLDINGS

BACKGROUND OF THE INVENTION

This invention relates to expandable polyurethane powder preparations which contain blowing agents, and to their use for the production of foamed polyurethane moldings.

Powders play an important part in many areas of plastics manufacture and processing. By virtue of their high degree of dispersion and, hence, flowability, they are used, for example, in the production of adhesives, coatings or thin-films.

The production of cellular (foamed) moldings of microcellular polyurethane elastomers or polyurethane (commonly referred to as PU) foams is also known and described in numerous patent specifications and publications (cf., for example, Kunststoff-Handbuch, Vol. 7, "Polyurethan (Polyurethane)", 1st Edition 1966, 2nd Edition 1983, Carl-Hanser-Verlag, Münohen/Wien). These moldings are normally produced by introducing pourable or flowable reaction mixtures of organic polyisocyanates, compounds containing at least two reactive hydrogen atoms, and liquid blowing agents into (optionally) heated molds in which the reaction mixtures are subsequently foamed and cured.

It is known that polyurethane moldings having a compact, substantially pore-free outer skin or surface and a cellular core (i.e. integral PU foams) can be produced by introducing more of the foamable reaction mixture into the mold than would be required for completely filling the mold cavity with the foamed up mixture without the application of pressure. Foaming is carried out inside a closed mold under conditions of compression.

There are numerous applications, for example, soundproofing in the engine compartment of motor vehicles, which require thin sheets or films of PU foam which are produced in a number of complicated individual steps by dividing up (cutting or stamping) large PU foam slabs or by bonding waste PU foam under pressure. It would be desirable to produce the foam moldings directly in the desired mold in as few operations as possible. Unfortunately, the foaming and curing of the usual liquid reactive systems in such small foam molds is difficult to carry out.

It is also known that decorative plastic films for the interior of motor vehicles can be back-foamed. The films or skins are preferably back-foamed with PU foam based on a liquid reaction mixture (cf. for example R. Pfriender, Kunststoffe, 76 (1986), 10, pages 90 et seq.). Standard practice uses thermoformed PVC/ABS films which are back-foamed in a second step which requires changing the mold. PU films produced from liquid systems may be processed by the IMC (in-mold coating) process. However, production of the components is very complicated and still not optimized (Dr. M. Wachsmann, Kunststoffberater, 10 (1987), pages 27 to 28).

By contrast, the powder slush molding process allows much finer, structured and back-foamed films (i.e. higher quality films) to be produced. The process normally uses PVC powder gelled by rotation in a mold heated to about 250° C. After cooling of the mold, the film can be removed and used for back-foaming. The produced film has to be transferred to another mold, i.e. a second apparatus is needed to complete back-foaming.

One disadvantage of PVC films back-foamed with PU foams is that the PVC film and the back foaming adversely affect one another. Catalysts or stabilizers from the PU foam are capable of diffusing into the PVC surface layer. Also, plasticizers from the PVC film can migrate into the PU foam. These processes can mechanically damage the moldings, for example, by way of embrittlement or discoloration. This harmful interaction can be avoided by using a PU powder to produce the surface layers, then back-foaming with a PU foam. The resultant uniform composite is easier to further process. A simplified process in which the skin produced could be directly back-foamed in the same mold would be an advantage in this regard.

German Offenlegungsschrift 3,916,874 discloses granulating and grinding of thermoplastic polyurethanes (TPU) produced from the melt by extrusion or belt processes to obtain PU powders. These PU powders can be processed to films by sintering.

The sintering of this type of TPU powders in admixture with a blowing agent which is a solid at 23° C. to form cellular PU moldings, preferably in sheet form, has also been described. These PU powder mixtures containing blowing agent may be used, for example, in the powder slush process previously mentioned to back-foam the prepared skin without having to change the mold (German Offenlegungsschrift 4.006.648).

A disadvantage of this procedure, i.e. using TPU produced by extrusion or belt processes, is the complicated subsequent grinding step required to produce the powder. Grinding must be done under intensive cooling conditions, for example with liquid nitrogen, due to the toughness of the materials used. In addition, expensive equipment is required to stop dust emissions. The irregular shape of the ground material can result in problems concerning the flowability of the powder. The high temperatures of the extrusion or belt process causes the production of the TPU powder mixture containing a blowing agent to be carried out by subsequent mixing of the powder with the blowing agent, which is also a powder solid at 23° C., so an additional complicated step is involved.

It is also known that isocyanates can be reacted with monofunctional reactants ("masking agents") to form thermolabile adducts. Suitable examples of masking agents include oximes, caprolactam or phenol derivatives. Systems which are thermoplastic up to the cleavage temperature of the adducts and which crosslink beyond that temperature can be formed using these "masked isocyanates".

Uretdiones or uretdione polyisocyanates and their use in one-component reactive PU systems is also known per se. The polyisocyanates containing uretdione groups are formed by combining (i.e. "dimerizing") two isocyanate groups in the presence of special catalysts. At elevated temperatures, the uretdione groups split up to reform two isocyanate groups which continue reacting with crosslinking, for example, in the presence of OH groups. This is done without the release of a "masking agent".

In every case, thermoplastically processable systems are obtained. Upon processing, they form crosslinked structures having several advantages (e.g. higher thermal stability and tensile strengths).

the production of one-component PU system containing masked isocyanates by the conventional extrusion or belt process in the melt, which applied for thermoplastic PU, is described, for example, in the forementioned German Offenlegungsschrift 3,916,974 and in German Offenlegungsschrift 4,006,648. These systems can crosslink during production, because the decomposition temperature is reached or exceeded. In addition, the produce has to be subsequently reduced to powder, which is rather expensive.

By comparison, the direct production of PU powders known per se by polyaddition in an emulsion stabilized by interfacially active copolymers (see, for example, U.S. Pat. No. 4,985,490, and EP 0 394 789), immediately results in powders which flow freely at comparatively moderate reaction temperatures.

It was an objective of the present invention to provide suitable powder-form, fusible and, optionally, post-cross-linkable polyurethane systems for applications in which the production of cellular PU moldings with relatively small layer thicknesses or the back-foaming of compact films in the mold would be an advantage. These systems should not require an expensive grinding process or subsequent mixing with blowing agents. This objective has been met by the following process.

DESCRIPTION OF THE INVENTION

The present invention relates to a process for the production of an expandable polyurethane powder preparation containing a blowing agent comprising the steps of a) producing an emulsion of fine droplets of a component IA which contains free NCO groups or of a component IB which contains groups which are reactive towards NCO groups, with the addition of a surface-active compound to stabilize the emulsion;

b) reacting said stabilized emulsion of component IA with a component IIA which contains an average of two hydrogen atoms, which are reactive towards NCO groups per molecule, or said stabilized emulsion of component IB with a component IIB which contains an average of two NCO groups per molecule, in an inert, organic liquid carrier phase in which components IA, IB, and the resultant reaction product are insoluble or immiscible, thereby forming spherical particles of powder which are protected against agglomeration by the surface-active compound; and c) separating the powder from said inert, organic carrier phase;

characterized in that a powdered blowing agent which is solid at room temperature (25° C.) and insoluble in said carrier phase, is added to said inert organic carrier phase either before or after said reaction step b).

These polyurethane powder preparations which contain a blowing agent and are prepared according to the above process may be used for the production of foamed polyurethane moldings by sintering at an elevated temperature inside a mold in which the powder is melted and expanded through thermal decomposition of the blowing agent.

In one preferred embodiment of the process for the PU powder preparation, the blowing agent is actually added during the reaction step b). For example, the blowing agent can be added to the emulsion of component IA or IB according to the invention. This avoids subsequent mixing of the polyurethane powder with the blowing agent and any related problems (e.g. dust emission).

Powder-form blowing agents which are solid at room temperature (25° C.) and having an average particle size of from about 1 to 300$\mu$, and preferably up to 30$\mu$ may be homogeneously mixed with the polyurethane powder in the process of producing the polyurethane powder preparation containing a blowing agent. The particle size influences the decomposition temperature and the decomposition rate of the blowing agent.

It is best to use chemical compounds which decompose with a high gas yield within a certain, narrow temperature range. The decomposition temperature must be adapted to the processing temperature and to the thermal stability of the polyurethane systems according to the invention used. If the blowing agent is actually added during the production of the polyurethane powder, as explained in more detail hereinafter, it should not react with the starting materials so as to interfere with the production of the powder, and it should not dissolve in the carrier phase. In addition, the decomposition products formed during the thermal decomposition process should be physiologically safe, and not adversely effect the thermal stability or mechanical properties of the foamed polyurethane moldings produced according to the invention. These decomposition products should not effloresce or have a discoloring effect either.

Solid blowing agents which at least partly satisfy these requirements are, for example, azo compounds, such as, for example, azoisobutyronitrile, azodicarbonamide (i.e. azo-bis-formamide) or barium azodicarboxylate; substituted hydrazines, such as, for example, diphenylsulfone-3,3'-disulfohydrazide, 4,4'-hydroxy-bis-(benzenesulfohydrazide), trihydrazinotriazine or aryl-bis-(sulfohydrazide); semicarbazides, such as, for example, p-tolylene sulfonyl semicarbazide or 4,4'-hydroxy-bis-(benzenesulfonyl semicarbazide); triazoles, such as, for example, 5-morpholyl-1,2,3,4-thiatriazole; and N-nitroso compounds, such as, for example, N,N'-dinitrosopentamethylene tetramine or N,N-dimethyl-N,N'-dinitrosophthalmide; benzoxazines, such as, for example, isatoic anhydride; or blowing agent compositions, such as, for example, sodium carbonate/citric acid mixtures. Of the compounds mentioned, the azo compounds and hydrazines are preferred. The solid blowing agents, according to the invention, may be used either individually or in admixture with one another. Azodicarbonamide, which is commercially available in various, defined average particle sizes, is particularly preferred for the process for the production of the expandable polyurethane powder preparation containing a blowing agent.

Component IA is preferably either an NCO prepolymer which is prepared either separately or in the organic carrier phase within the invention by reaction of an NCO-reactive compound with a polyisocyanate.

Aromatic, aliphatic or cycloaliphatic diisocyanates or mixtures thereof are suitable polyisocyanates. It is important that these diisocyanates should either be liquid or emulsifiable in liquid form in the carrier phase at the reaction temperatures of the process. The NCO prepolymer formed should also be emulsifiable in liquid form. Tolylene diisocyanate (2,4- and 2,6-isomer or mixtures thereof), diphenyl methane diisocyanate (4,4'- and 2,4'-isomer or mixtures thereof), 1,4-phenylene diisocyanate, 1,5-naphthylene diisocyanate are suitable examples of aromatic diisocyanates. 1,5-naphthylene diisocyanate is less preferred due to its high melting point. Suitable aliphatic diisocyanates include, for example, hexamethylene-1,6-diisocyanate, xylylene diisocyanate and 1,12-dodecane diisocyanate. 4,4'-methylene-bis-(cyclohexyl diisocyanate), 1,4-cyclohexyl diisocyanate and isophorone diisocyanate are disclosed as suitable examples of cycloaliphatic diisocyanates.

Aliphatic or cycloaliphatic diisocyanates, such as 1,6-hexamethylene diisocyanate or 4,4'-methylene-bis(cyclohexyl diisocyanate) are preferred if products not discoloring upon exposure to light are required.

Component IIB which contains an average of two free NCO groups per molecule is preferably one of the polyisocyanates mentioned above or a mixture of several of these polyisocyanates.

High molecular weight glycols containing on average two hydroxy groups and having average molecular weights of from about 400 to 6000 are preferably used as component IB or as isocyanate-reactive compounds for the production of an NCO prepolymer used as component IA. Component IA is preferably an NCO prepolymer. Suitable high molecular weight glycols include, for example, hydroxyfunctional polyesters, polycarbonates, polyester carbonates, polyethers, polyether carbonates, polyacetals, polyacrylates, polybutadienes, polyester amides or polythioethers. Aminofunctional polyethers (as described in U.S. Pat. No. 4,724,252 and German Offenlegungsschrift 3,713,858, incorporated herein by reference) may also be used. Compounds containing on average two NCO-reactive groups per molecule are preferred. Compounds of higher functionality may be used, but the incorporation of monofunctional reactants is necessary to ensure the thermoplasticity of the PU powder.

Suitable polyethers include, for example, those obtained by ring-opening polymerization of propylene oxide or ethylene oxide in the presence of one or more compounds containing active hydrogen. Ring-opening polymerization of tetrahydrofuran also results in suitable polyethers.

If light-stable products are required, polyesters, polycarbonates or polyester carbonates are preferred. Suitable polyester polyols may be obtained, for example, by condensation of one or more dicarboxylic acids, anhydrides or diesters thereof, by reaction with one or more low molecular weight glycols. Suitable dicarboxylic acids include, for example, succinic acid, adipic acid, suberic acid, and aromatic dicarboxylic acids such as, for example, phthalic acid, isophthalic acid or terephthalic acid, or the corresponding partly hydrogenated or perhydrogenated types. Suitable low molecular weight glycols include, for example, ethylene glycol, 1,2- or 1,3-propylene glycol, 1,4- or 2,3-butanediol, neopentyl glycol, 1,6-hexanediol, 1,8-octanediol, cyclohexane dimethanol, diethylene glycol or dipropylene glycol. Polyesters obtained by polymerization of lactones, such as $\epsilon$ caprolactone for example, are also suitable. Suitable aliphatic hydroxyfunctional polycarbonates may be prepared, for example, by the reaction of the low molecular weight glycols mentioned above with diaryl carbonates or cyclic carbonates, such as propylene carbonate.

The high molecular weight glycols or aminopolyethers mentioned above are suitable as components IB and IIA, according to the invention. However, component IIA is preferably an NCO-reactive compound having a molecular weight below 400 (e.g. the low molecular weight glycols mentioned in connection with the aliphatic polyesters). Suitable compounds also include aminoalcohols, such as, for example, N-methyl diethanolamine or aminoethanol; and diamines, such as, for example, ethylenediamine, 1,6-diaminohexane, or piperazines, hydrazines, hydrazides and semicarbazides. Mixtures of the previously disclosed high molecular weight and low molecular weight diols are also suitable as components IB and IIA. It is preferred to use the low molecular weight glycols as component IIA in the production of the PU powders, according to the invention.

In another embodiment of the invention, the powder preparation containing a blowing agent can be produced using a component III which effects post-crosslinking during melting of the powder.

Component III is a reaction product which is separately prepared or mixed or co-emulsified with component IA or IIB according to the invention. If component III contains no free NCO groups it can be prepared, mixed or co-emulsified with IB or IIA. It is preferably prepared, mixed, or co-emulsified with IA.

Component III used in accordance with the invention, which may contain partially blocked NCO groups, may be a reaction product which is inert to NCO-reactive groups under the conditions applied in the production of the PU powder, according to the invention, i.e. an outwardly NCO-free reaction product containing partially blocked NCO groups, or alternatively, a reaction product reactive toward NCO-reactive groups, i.e. a reaction product containing free NCO groups and partially blocked NCO groups which, on average, contains at most two reactive NCO groups, so that it can be incorporated in the powder without preliminary crosslinking. Finally, component III used in accordance with the invention may also be a mixture of two such reaction products.

Component III may be prepared, for example, by partial or complete reaction of a polyisocyanate with a blocking agent, or with a blocking agent and another NCO-reactive compound (e.g. a polyol). It is important that the resultant reaction product be either homogeneously miscible or co-emulsifiable with component IA or IB with which it is mixed or co-emulsified. Advantageously, it should be liquid or fusible at the temperatures applied in accordance with the invention.

Suitable polyisocyanates for reaction with a blocking agent and, optionally, another NCO-reactive compound include, for example, the aforesaid diisocyanates. Advantageously, polyisocyanates having higher functionalities are used. These include, for example, the crosslinking isocyanates known in the lacquer and coating industry such as polymers of diphenyl methane diisocyanate, biurets, trimethylol propane adducts or trimers (isocyanurates) of the diisocyanates mentioned above.

In order to establish a specific melting behavior and to increase commatibility with components IA or IB, another NCO-reactive compound may be reacted with the partially blocked polyisocyanate for the production of component III. The afore-said high molecular weight glycols are preferably used. In case that an Isocyanate of higher functionality is used, the ratio of glycol to blocking agent has to be fixed to such a value that no premature gelatinization of component III occurs, i.e. that the gel point is not reached.

Suitable blocking agents or example, an oxime (preferably butanone oxime), a lactam (preferably $\epsilon$ caprolactam), an acetoacetate (preferably ethyl acetate), a malonate (preferably diethyl malonate), or a substituted phenol. Within the substitued phenols, p-hydroxybenzoic acid esters (e.g. p-hydroxybenzoic acid ethyl ester) are particularly preferred. They have low cleavage temperatures (less than 150° C.), and the ester eliminated has a low volatility and no unpleasant odor. In one preferred embodiment of the invention, component III may be obtained by reaction of the trimer (i.e. isocyanurate) of 1,6-hexamethylene diisocyanate with a hydroxyfunctional polyester, especially a polyadipate having a melting range of no more than 100° C. In another embodiment of the invention, 1,3-bis-(isocyanato-organo)-2,4-dioxo-1,3-diazetidines or 3,5-bis-(isocyanato-organo)-2,4,6-trioxotetrahydro-1,3,5-oxadiazines, such as, e.g., the adduct of 2 moles 1,6-hexamethylene diisocyanate and 1 mole carbon dioxide, may also be used as blocked polyisocyanates.

In another preferred embodiment of the invention, other polyisocyanate adducts which regenerate NCO functionality upon heating without releasing a "splitter" may be used as a constituent of component III. The aforesaid isocyanate dimers or uretdiones are preferably used for this purpose. Some examples include the dimers of tolylene diisocyanate, diphenyl methane diisocyanate, isophorone diisocyanate, 1,6-hexamethylene diisocyanate, and mixtures of such dimers.

These uretdione isocyanates may be used as component III either alone or in admixture with other polyisocyanates. In order to reduce functionality where there are on average more than two free NCO groups per molecule, they may, for example, be reacted as such or in admixture with other polyisocyanates with NCO-reactive monofunctional compounds (e.g. alcohols). The resultant products can then be used as component III, and will contain free NCO groups. They may be reacted either as such or in admixture with other polyisocyanates with a mixture of a high molecular weight glycol and a monofunctional NCO-reactive compound to adjust functionality. They may also be used individually or in admixture with other polyisocyanates for the production of component III using blocking agents, as previously described.

If light-stable products are required, the uretdiones of aliphatic and cycloaliphatic diisocyanates are preferably used. Thus, in one preferred embodiment, the dimer of 1,6-hexamethylene diisocyanate which still contains small quantities of trimers (isocyanurate) is reacted with a monofunctional alcohol (preferably n-butanol, n-octanol or n-dodecanol) to adjust functionality. On the average, approximately two NCO groups per molecule are left. Advantageously, the products containing butanol and octanol are liquid at room temperature, and are preferably used as component III.

The components III obtained using an external blocking agent, such as e.g. p-hydroxybenzoic acid ester, provide for the production of free-flowing, thermoplastically processable and rapidly post-crosslinking powders.

By using the uretdione polyisocyanates in the absence of a blocking agent, it is possible to produce splitter-free, thermoplastically processable, post-crosslinkable polyurethane powders.

Advantageously, more or less crosslinked, foamed polyurethane moldings having the desired level of properties can be produced by using component III, in accordance with the invention.

The amount (i.e. percent) of component III in the powder mixture is limited by the need for sufficiently effective crosslinking. This is based on the desired level of properties in the foamed moldings. The danger of overcrosslinking results in a powder which no longer melts properly. Component III is preferably used in such a quantity that the theoretical maximum number of NCO groups formed by deblocking or decomposition, relative to the total number of free or blocked NCO groups, is approximately 1 to 20%, and preferably at least 3%.

The PU powder should have a substantially equal amount of of NCO groups (blocked and unblocked) and of NCO-reactive groups, excluding any NCO-reactive groups formed by the splitters. The NCO groups released during processing of the powder ideally react with those NCO-reactive groups which remain after the reaction of component IA or IIB with added components IB or IIA, respectively. Accordingly, the percentage of components IB or IIA should be selected to provide an excess of NCO-reactive groups substantially corresponding to the number of blocked NCO groups in component III, after the reaction with the free NCO groups of components IA, IIB or III. By using a slightly more or less equivalent number of blocked NCO groups, it is possible to control the melting behavior and post-crosslinking of the PU powders. Accordingly, it is advantageous to control the quantity of blocked NCO groups. It is preferable to coordinate the individual components used in the production of the PU powders with the other components such that the powder remains thermoplastically processable, and preferably melts at a temperature of from 150° to 220° C.

The liquid organic carrier phase may be any liquid which does not react with the reactants, e.g. with NCO groups or groups containing active hydrogen, and in which at least the mixture of the first and second components and the resultant reaction product are immiscible and insoluble. It is preferable to use liquids which do not caused swelling of the PU powder. It is also desirable that the liquid be sufficiently volatile to allow easy removal of residues from the powder and that the boiling point be above the reaction temperature. Liquids of relatively low boiling point may also be used. However, pressure vessels may be required to reach the desired reaction temperature. Liquids which are difficult to remove from the product, due to e.g. their boiling point, can be removed by washing or extraction with other, more volatile liquids not damaging to the product. The highest boiling point of the liquids is limited by the decomposition temperature of the blowing agent where it is added before or during the reaction, and possibly by the tendency of the blocked isocyanate groups in the PU powder to back-react. Accordingly, organic liquids with boiling points or boiling ranges between about 40° and 200° C., such as e.g. hydrocarbons, halogenated hydrocarbons and ethers, are suitable for the production of the PU powders. Liquid hydrocarbons, preferably aliphatic hydrocarbons, e.g. petroleum fractions, are particularly suitable due to their low cost, their inertness to the reactants, and the ease and completeness with which they are removed from the reaction product.

The inert organic carrier phase is used in a quantity of preferably 20 to 90%, and more preferably 40 to 80%, based on the weight of the mixture as a whole.

Preferred surface-active compounds for the process, according to the invention, are nonionic polymeric materials having a molecular weight above 1000 which contain apolar groups (e.g. hydrocarbon radicals) and highly polar groups (e.g. amide, ester, or carbonyl groups). Suitable examples include the urethane/acrylate copolymers described in U.S. Pat. No. 5,071,923, herein incorporated by reference. Preferred surface-active compounds are the copolymers of N-vinyl-2-pyrrolidone (NVP) with an $\epsilon$ olefin having 4 to 20 carbon atoms that contain alkyl side chains having 2 to 18 carbon atoms and in which the proportion of the alkylated olefin is between about 10 and 80% at a molecular weight above 1000, preferably above 4000. The surface-active compound is generally used in quantities of from about 0.5 to 10%, based on the total weight of the reactants.

Catalysts may be used in the production of the powders according to the invention. Suitable catalysts include, for example, those generally known in PU chemistry which accelerate the reaction of isocyanate groups with compounds containing active hydrogen. If a reaction with the isocyanate used is necessary for the production of component III, the catalysts may be used for this reaction. If component IA is separately prepared, the catalysts may be used in the preparation. They may also be used in the reaction of the emulsion of the mixture of components IA or IB with components IIA or IIB, respectively, in the presence of component III. Catalysts which readily dissolve in the organic carrier phase are preferred.

Suitable catalysts are, for example, tertiary amines, such as e.g. triethylenediamine; mercury, lead and bismuth catalysts. Tin catalysts, such as tin octoate or dibutyl tin dilaurate or alkyl esters of diorganotin dimercaptocarboxylic acids, are preferred. The catalysts are used in quantities of up to 10%, based on the total weight of the reactants.

In the production of the polyurethane powder preparation containing a blowing agent, the solid powder-form blowing agent, according to the invention, is usually added at temperatures below 80° C. Advantageously, by addition of the blowing agent before removal of the organic carrier phase, dust emission during mixing is avoided.

The PU powder preparation containing a blowing agent may be produced, for example, by emulsification of a component IB in the form of a mixture of high molecular weight and low molecular weight glycol (i.e. OH component) in the liquid carrier phase by means of the surface active compound. Component III (in one embodiment without free NCO groups) may optionally be added. The reaction (temperature, catalyst addition) must be conducted to ensure that the masked or blocked NCO groups in component III do not react prematurely with component IB. The reaction resulting in the PU powder preparation then occurs by the addition of component IIB, e.g. an aliphatic diisocyanate. Alternatively, components IIB and, optionally, III (either with or without free NCO groups) may be added either successively or in admixture with the emulsified component IB. Upon completion of the reaction, the solid powder-form blowing agent may be mixed with the formed suspension, e.g. by intensive stirring, before the separation step c), and then the resultant polyurethane powder preparation containing a blowing agent may be separated from the carrier phase.

In one preferred embodiment of the invention, the polyurethane powder preparation containing a blowing agent is produced by addition of the solid powder-form blowing agent to components IA or IB or intermediates thereof, followed by co-emulsification. In this way, the blowing agent is incorporated in the droplets of the emulsion and subsequently in the solid particles of the resulting polyurethane powder preparation containing a blowing agent. Advantageously, dust emission by the addition of the blowing agent is largely avoided during working up of the PU powder preparation containing the blowing agent.

An NCO prepolymer may be separately prepared, for example as component IA, as a melt at a temperature considerably below the decomposition temperature of the blowing agent, and the solid blowing agent may be added at this point. The melt containing the blowing agent is then emulsified with a surface-active compound in the inert organic carrier phase. The blowing agent may, alternatively, be incorporated in the intermediate stages of the production of this prepolymer, i.e. for example, an aliphatic hydroxyfunctional polyester and an aliphatic isocyanate, and the intermediate stages may be reacted in the inert organic carrier phase to form an emulsion of component IA. The separately prepared component III (optionally used), which contains blocked NCO groups, is either preferably mixed with a melt of component IA (separately prepared) and the resulting mixture emulsified in the carrier phase, or component III (in the form of a melt or liquid) is added to the emulsion of component IA in the inert organic carrier phase. The necessary quantity of component IIA is added, and the reaction occurs substantially to completion, yielding the PU powder preparation in a suspension. The reaction time can be controlled by the amount of catalyst used and the temperature applied. The upper limit of the temperature range depends on the decomposition temperature of the blowing agent and any blocked isocyanates used. The polyurethane powder preparation containing the blowing agent may be separated from the carrier phase, e.g. by filtration and subsequent drying below the deblocking temperature of any blocked isocyanates used, the decomposition temperature of the blowing agent, and the melting point of the resultant powder.

Advantageously, following separation step c), the carrier phase may be reused in cases where the preferred catalysts and emulsifiers readily soluble in the carrier phase are used, such as the NVP olefin copolymers disclosed above. After washing the powder with the solvent used in the carrier phase, these catalysts and emulsifiers almost completely remain in the filtrate.

The resultant reaction product of step b) is in the form of spherical particles of powder which are between about 10 and 500$\mu$ in diameter. The type and quantity of surfactant used, and the intensity of stirring and the prevailing temperature during the reaction influence the particle size distribution. The blowing agent should have an average particle size distinctly smaller than that of the powder if it is to be incorporated in the powder particles.

The quantity of blowing agent required for the production of the polyurethane powder preparation is dependent inter alia on the geometry, density and thickness of the moldings to be produced, and on the gas yield of the blowing agent. It is preferred to use from 0.1 to 10 parts by weight, more preferably from 0.5 to 5 parts by weight, of at least one powder-form blowing agent which is a solid at least at room temperature (25° C.).

Additives, e.g. fine-particle solids, such as, for example, talcum or vapor-phase silica, to improve the flow properties of the powder or melt, may be added at any stage before filtration, or may even be subsequently added to the produced PU powder preparation containing a blowing agent. This also applies to other additives such as, for example, organic dyes (ultramarines or phthalocyanines) or inorganic pigments, titanium dioxide or carbon black, antioxidants, UV stabilizers, flow aids, etc. In one preferred embodiment of the invention, the additives are added to one of the liquid or molten starting materials, i.e. preferably to components IA or IB or to any of their starting materials.

The polyurethane powder preparation containing a blowing agent may be used for the production of foamed (cellular) polyurethane moldings. Here, it is heated to a temperature above the decomposition temperature of the blowing agent at which it melts. The procedure as described in German Offenlegungsschrift 4,006,648, incorporated herein by reference, may be used. For example, the PU powder preparation containing a blowing agent may be applied in a sufficient quantity (i.e. for the required thickness of the cellular molding) to the surface of a mold, heated to 150° to 280° C., preferably to 150° to 220° C., and after a short contact time (e.g. 10 to 30 seconds), excess PU powder preparation containing blowing agent may be removed. Sintering and foaming of the powder layer adhering to the surface of the mold then takes place under the heat effect of the mold or by renewed heating. After 0.5 to 10 minutes, the mold may be cooled (e.g. with an airstream or water bath), and the foamed PU molding formed by this process is removed from the mold.

The PU powder preparation containing a blowing agent may also be processed in a closable, temperature-controlled cavity mold to form foamed PU moldings. For example, by introducing a sufficient quantity of the PU powder preparation containing blowing agent to fill the mold with foam into the cavity of the mold temperature-controlled to 150° to 280° C., preferably to 150° to 220° C., closing the mold, and then melting and foaming the preparation by continued heating for 0.5 to 30 minutes and preferably for 0.5 to 15 minutes. Precautions must be taken to ensure that gases and excess quantities of foam can escape. After cooling the mold (by the aforesaid method), the foamed PU molding formed is removed from the mold.

The possibilities for obtaining special effects (surface structure, coatings, etc.) as described in German Offenlegungsschrift 4,006,648, herein incorporated by reference, can be applied to the polyurethane powder preparations containing a blowing agent and to the moldings produced with them.

The foamed moldings produced with the polyurethane powder preparation, according to the invention, are preferably sheet-form materials up to 5 cm in thickness, and having an overall density of about 0.1 to 1 g/cm$^3$, preferably 0.15 to 0.5 g/cm$^3$. The density of the moldings can be increased by the use of fillers. The moldings can range from brittle and hard, to tough and hard, or from flexible, to elastic and flexible, depending on the starting materials used. Advantageously, component III can be used to modify the mechanical properties, such as tensile strength, elasticity or density. Reinforcing fillers, such as glass fibers, for example, can be incorporated into the PU powder preparation to further vary the property spectrum.

The foamed moldings produced with the polyurethane powder preparation containing a blowing agent are suitable for use in the engine compartment and interior of motor vehicles, e.g. as sound insulation in the engine compartment, for pillar or door linings, roofs, armrests or instrument panels. They are also suitable, for example, for the production of furniture (e.g. upholstered furniture), artificial leather, inner shoes or bags. The may also be used as either the outer layer, interlayer, or as an insert in the production of shoe soles.

The invention is further illustrated but is not intended to be limited by the following examples in which all parts and percentages are by weight unless otherwise specified.

EXAMPLES

The following substances are used in the Examples:

Polyester I = Polyester polyol based on adipic acid, hexanediol; average OH value 48.

Polyester II = Polyester polyol based on adipic acid, hexanediol, neopentyl glycol; average OH value 56.

Pigmented polyester II = Polyester II in which a mixture of 97 parts titanium dioxide powder and 3 parts carbon black (25 parts pigment to 100 parts mixture) were incorporated in a heated (90° C.) mill with a fixed corundum disc and rotor (commercially available from Fryma Maschinen AG, Rheinfelden); OH value 42.

Polyether = Polypropylene glycol; OH value 112.

Antaron = Antaron® V 220, a commercially available emulsifier (from GAF); copolymer of 20% by weight N-vinyl pyrrolidone and 80% by weight 1-eicosene.

Stabaxol = Stabaxol® I, a commercially available carbodiimide (from Bayer AG) used as a hydrolysis stabilizer.

BHT = Commercially available stabilizer (butylated hydroxytoluene)

IPPD = Commercially available stabilizer (isopropylphenyl phenylenediamine)

Blowing agent = Commercially available azodicarbonamide (from Bayer AG) having an average particle size of 5 μm and a decomposition point of approx. 200° C.

EXAMPLE 1

(According to the Invention)

(Polyurethane powder preparation containing a blowing agent based on polyester/aliphatic isocyanate, post-crosslinked with split-off component; blowing agent stirred in before filtration)

a) Production of the Moderator Component with Split-Off Component (i.e. Crosslinker) = Component III 800 Parts of an isocyanurate of 1,6-hexamethylene diisocyanate (HDI trimer: %NCO = 21.5) are reacted with 543.9 parts p-hydroxybenzoic acid ethyl ester at 100° C. After about 1 h, 859 parts Polyester I (described above) are added and the mixture is reacted until no more free isocyanate can be detected. The product obtained solidifies below 50° C. and may then be used in portions.

b) Production of Powder 68.7 Parts polyester I are heated to 100° C., mixed, freed from water in vacuo and degassed. 0.2 Part Stabaxol and 0.5 part BHT are then added. The mixture is reacted with 19.1 parts 1,6-hexamethylene diisocyanate at 80° C. until the NCO value is constant (calculated 8% NCO), 3.6 Parts of the crosslinking component (i.e. component III) described in a) are then added.

A solution of 5 parts Antaron and 2 parts dibutyl tin dilaurate in 233 parts isooctane is heated to 90° C. The polyester/HDI prepolymer (92.1 parts by weight) is then added with vigorous stirring over a period of about 10 minutes (double propeller stirrer; 1100 r.p.m.). After 30 minutes, 7.7 parts 1,4-butanediol are added. The dispersion is then stirred for about another 2 hours at 90° C. until no more free isocyanate can be detected. The heat is removed and, after cooling, 3 parts blowing agent are added with stirring to the sedimenting suspension formed. The mixture containing the blowing agent is then filtered through a Buchner funnel. The filter residue is washed twice with 100 parts isooctane, and then dried in vacuo for 48 hours at room temperature. A free-flowing powder melting at approximately 170° C. is obtained. More than 99% by weight of the particles have particle sizes of <315 μm.

To produce a foamed sheet-form material, a sufficient quantity of the polyurethane powder preparation containing the blowing agent is knife-coated onto a metal plate (layer thickness approx. 3.5 mm) and heated in an oven for 15 minutes at 200° C. The powder mixture initially melts and then begins to foam through decomposition of the blowing agent. After cooling and demolding, a medium-hard, elastic foamed sheet is obtained. It has a thickness of 10 mm and a density of 0.16 g/cm³.

EXAMPLE 2

(According to the Invention)

(Polyurethane powder preparation containing a blowing agent based on polyether/aromatic isocyanate; blowing agent stirred in before filtration)

8.4 Parts polyether are heated to 100° C., mixed, freed from water in vacuo and degassed. The mixture is reacted with 5.4 parts 4,4'-diphenyl methane diisocyanate until the NCO value is constant (calculated 8% NCO).

A solution of 0.45 part Antaron and 0.3 part dibutyl tin dilaurate in 35 parts isooctane is heated to 90° C. The polyether/isocyanate prepolymer (13.8 parts by weight)is introduced with vigorous stirring over a period of about 10 minutes (double propeller stirrer; 1100 r.p.m.). After 30 minutes, 1.2 parts 1,4-butanedial are added. The dispersion is stirred for about another hour at 90° C. until no more free isocyanate can be detected. The heat is removed and, after cooling to room temperature, 0.45 part blowing agent is added to the sedimenting suspension formed. The mixture is containing the blowing agent is then filtered through a Buchner funnel. The filter residue is washed twice with 15 parts isooctane and then dried in vacuo for 48 hours at room temperature, a free-flowing powder having a melting point of approx. 180° C. is obtained. More than 99% by weight of the particles have particle sizes of <315 μm.

To produce a foamed sheet-form material, a sufficient quantity of the polyurethane powder preparation containing the blowing agent is knife-coated onto a metal plate (layer thickness approx. 4 mm) and heated in an oven for 15 minutes at 200° C. The powder mixture initially melts and then begins to foam through decomposition of the blowing agent. After cooling and demolding, a very soft, inelastic foamed sheet is obtained. It has a thickness of 8 mm and a density of 0.2 g/cm³.

EXAMPLE (According to the Invention)

(Grey-pigmented polyurethane powder preparation containing a blowing agent based on polyester/aliphatic isocyanate; post-crosslinking without split-off component; incorporation of the blowing agent in the powder particles)

a) Preparation of the Crosslinking Component=Component III

491 Parts of a uretdione polyisocyanate (%NCO=21.4) obtained by dimerization of 1,6-hexamethylene diisocyanate are reacted with 81.3 parts n-octanol at 90° C. until the %NCO content is constant (calc. 13.9%). The product obtained is liquid at room temperature and can be conveniently metered in portions.

b) Production of the Powder 58.4 Parts polyester II and 8 parts pigmented polyester II are heated to 100° C., mixed, freed from water in vacuo and degassed. 0.2 Part Stabaxol and 0.5 part BHT are added. The mixture is reacted with 18.4 parts 1,6-hexamethylene diisocyanate at 80° C. until the NCO value is constant (calculated 8% NCO). 6.2 parts of the crosslinking component described in a) are then added. Finally, 1.5 parts blowing agent are added to the prepolymer melt with stirring. Stirring is continued for about 10 more minutes.

A solution of 5 parts Antaron and 2 marts dibutyl tin dilaurate in 233 parts isooctane is heated to 90° C. The polyester/HDI prepolymer (93.2parts) is introduced with vigorous stirring over a period of about 10 minutes (double propeller stirrer; 1100 r.p.m.). After 30 minutes 8.3 parts 1,4-butanediol are added. The dispersion is then stirred for about another 2 hours at 90° C. until no more free isocyanate can be detected. The heat is removed and, after cooling to room temperature, the dispersion is filtered through a Buchner funnel. The filter residue is washed twice with 100 parts isooctane and then dried in vacuo for 48 hours at room temperature. The free-flowing grey powder obtained contains the blowing agent in the powder particles and melts above 160° C. More than 99% by weight of the particles have a particle size of less than 315 μm.

To produce a foamed sheet-form material, a sufficient quantity of the polyurethane powder preparation containing a blowing agent is knife-coated onto a metal plate (layer thickness approx. 3 mm), the non-sintered excess of the mixture is removed and the mixture is heated in an oven for 10 minutes at 200° C. The powder mixture first melts and then begins to foam through decomposition of the blowing agent. After cooling and demolding, a soft, elastic foamed sheet is obtained. It has a thickness of 8 mm and a density of 0.2 g/cm³.

EXAMPLE 4

Back-Foamed PU Film

A back-foamed polyurethane film, for example for interior parts of automobiles, is produced by initially using a polyurethane powder preparation prepared as described in Example 3, but without the addition of blowing agent, for the production of the compact surface layer. A metal mold is preheated to approx. 200° C. The powder without added blowing agent is gelled to form a compact layer by contacting the surface of the mold, and subsequent heating for 5 minutes at 200° C. The polyurethane powder preparation containing a blowing agent according to the invention prepared as described in example 3 is applied to that side of the layer (still in the mold) remote from the mold, gelled, the unmelted excess is removed by turning the mold and the mold is then heated for another 10 minutes at 200° C. After cooling the mold, the foamed molding with its compact surface can be removed.

EXAMPLE 5

Foamed Molding with a Compact Surface

A completely foamed molding with a compact surface, for example a shoe sole, can be produced in a corresponding mold, for example consisting of a removable upper part and lower part. The upper and lower parts are separately heated to approximately 200° C. The polyurethane powder preparation containing a blowing agent according to the invention prepared as described in Example 3 is introduced into the lower mold part in a quantity based on the desired average foam density and the volume to be filled with foam. For example, approx. 70 g powder mixture for 240 cm$^3$ volume and a desired density of 0.3 g/cm$^3$. The mold is closed by replacing the upper part and heated for about 15 minutes at 200° C. After cooling, the foamed shoe sole, which has a compact surface, can be removed.

Although the invention has been described in detail in the foregoing for the purpose of illustration, it is to be understood that such detail is solely for that purpose and that variations can be made therin by those skilled in the art without departing from the spirit and scope of the invention except as it may be limited by the claims.

What is claimed is:

1. A process for the production of an expandable polyurethane powder preparation containing a blowing agent comprising the steps of
    a) producing an emulsion of fine droplets of a component IA which contains free NCO groups or of a component IB which contains groups which are reactive towards NCO groups, with the addition of a surface-active compound to stabilize the emulsion;
    b) reacting said stabilized emulsion of component IA with a component IIA which contains an average of two hydrogen atoms which are reactive towards NCO groups per molecule, or said stabilized emulsion of component IB with a component IIB which contains an average of two NCO groups per molecule, in an inert, organic liquid carrier phase in which components IA, IB, and the resultant reaction product are insoluble or immiscible, thereby forming spherical particles of powder which are protected against agglomeration by the surface-active compound; and
    c) separating the powder from said inert, organic carrier phase; characterized in that a powdered blowing agent which is solid at room temperature (25° C.) and insoluble in said carrier phase, is added to said inert organic carrier phase either before or after said reaction step b).

2. The process of claim 1 wherein said powdered blowing agent is added to at least one of the polyurethane raw materials prior to said production step a).

3. The process of claim 1 wherein said reaction step b) occurs in the presence of a separately prepared component III which contains blocked NCO groups.

4. The process of claim 2 wherein said reaction step b) occurs in the presence of a separately prepared component III which contains blocked NCO groups.

5. The process of claim 3 wherein said component III which contains partially blocked NCO groups is selected from the group consisting of
    a) the reaction product of an isocyanurate of 1,6-hexamethylene diisocyanate, a hydroxybenzoic acid ester and a polyol having an average molecular weight of 400 to 6000;
    b) a uretdione polyisocyanate preferably obtained by dimerization of hexamethylene diisocyanate or a reaction product of this uretdione polyisocyanate with one or more NCO-reactive compounds; and
    c) a mixture of a) and b).

6. The process of claim 1 which contains up to 20 parts by weight, based on the total solids content of the suspension, of at least one powdered blowing agent which is solid at room temperature (25° C.).

7. The process of claim 1 wherein said blowing agent is powdered azodicarbonamide.

8. The process of claim 1 wherein said component IA is a urethane NCO prepolymer obtained by reaction of a diisocyanate with a diol having an average molecular weight of 400 to 6000.

9. The process of claim 1 wherein said component IIA is a mixture of one or more diols having molecular weights below 400.

10. The production of foamed polyurethane moldings comprising heating a polyurethane powder preparation containing a blowing agent to a temperature above the decomposition temperature of the blowing agent to melt the polyurethane powder preparation containing a blowing agent, the improvement wherein said polyurethane powder preparation containing a blowing agent is prepared according to the process of claim 1.

* * * * *